(12) United States Patent
Seifert et al.

(10) Patent No.: US 7,641,109 B2
(45) Date of Patent: Jan. 5, 2010

(54) MONEY TRANSFER CARDS, SYSTEMS AND METHODS

(75) Inventors: Dean A. Seifert, Foxrock Dublin (IE); Thomas B. Sayor, Castle Rock, CO (US); Mark Baumgart, Larkspur, CO (US)

(73) Assignee: The Western Union Company, Englewood, CO (US)

( * ) Notice: Subject to any disclaimer, the term of this patent is extended or adjusted under 35 U.S.C. 154(b) by 265 days.

(21) Appl. No.: 11/132,710

(22) Filed: May 18, 2005

(65) Prior Publication Data

US 2006/0261150 A1    Nov. 23, 2006

(51) Int. Cl.
*G06Q 40/00* (2006.01)
(52) U.S. Cl. .............................. 235/380; 705/39; 705/44
(58) Field of Classification Search ................. 235/379, 235/380, 381; 705/43, 39, 44
See application file for complete search history.

(56) References Cited

U.S. PATENT DOCUMENTS

| | | | |
|---|---|---|---|
| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,385,285 A | 5/1983 | Horst et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,795,892 A | 1/1989 | Gilmore et al. |
| 4,812,628 A | 3/1989 | Boston et al. |
| 4,823,264 A | 4/1989 | Deming |

(Continued)

FOREIGN PATENT DOCUMENTS

EP    481135 A1    4/1992

(Continued)

OTHER PUBLICATIONS

Internet article "Western Union Money Transfer" available on Sep. 7, 2007 at http://www.moneytransfer.ie/SendReceive.htm and copyright 2003.*

(Continued)

*Primary Examiner*—Daniel A Hess
(74) *Attorney, Agent, or Firm*—Townsend and Townsend and Crew LLP

(57) ABSTRACT

The present invention provides systems and methods to initiate, facilitate, process and/or perform money transfers. One such method includes establishing a money transfer record (310) and receiving, from a vendor location, a money transfer activation request (320) associated with the money transfer record. The method includes receiving a fulfillment request (330) associated with the money transfer record, collecting a customer data set, and authorizing a money transfer (340) associated with the money transfer record. The money transfer is facilitated by the creation of a money transfer record, which may occur prior to the money transfer activation request. The customer then can initiate the money transfer while at the vendor location using, for example, money transfer cards available for purchase from the vendor.

20 Claims, 3 Drawing Sheets

U.S. PATENT DOCUMENTS

| | | | |
|---|---|---|---|
| 4,829,168 A | 5/1989 | Nakahara |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,283,829 A | 2/1994 | Anderson |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,546,523 A | 8/1996 | Gatto |
| 5,550,734 A | 8/1996 | Tarter et al. |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,686,713 A | 11/1997 | Rivera |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,777,305 A * | 7/1998 | Smith et al. ................. 235/380 |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,799,072 A | 8/1998 | Vulcan et al. |
| 5,806,045 A | 9/1998 | Biorge et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,457 A | 11/1998 | O'Brien et al. |
| 5,832,463 A | 11/1998 | Funk |
| 5,859,419 A | 1/1999 | Wynn |
| 5,865,470 A | 2/1999 | Thompson |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A | 5/1999 | Lorsch |
| 5,903,880 A | 5/1999 | Biffar |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,923,016 A | 7/1999 | Fredregill et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,974,146 A | 10/1999 | Randle et al. |
| 5,974,194 A | 10/1999 | Tackbary et al. |
| RE36,365 E | 11/1999 | Levine et al. |
| 5,978,780 A | 11/1999 | Watson |
| 5,987,426 A | 11/1999 | Goodwin, III |
| 5,991,748 A | 11/1999 | Taskett |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,018,724 A | 1/2000 | Arent |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,136 A | 2/2000 | Brake, Jr. et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,249 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,052,674 A | 4/2000 | Zervides et al. |
| 6,058,417 A | 5/2000 | Hess et al. |
| 6,061,799 A | 5/2000 | Eldridge et al. |
| 6,064,990 A | 5/2000 | Goldsmith |
| 6,070,150 A | 5/2000 | Remington et al. |
| 6,070,156 A | 5/2000 | Hartsell, Jr. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,104,815 A | 8/2000 | Alcorn et al. |
| 6,106,020 A | 8/2000 | Leef et al. |
| 6,119,106 A | 9/2000 | Mersky et al. |
| 6,119,931 A | 9/2000 | Novogrod |
| 6,119,933 A | 9/2000 | Wong et al. |

| | | | | | |
|---|---|---|---|---|---|
| 6,122,625 | A | 9/2000 | Rosen | | |
| 6,128,602 | A | 10/2000 | Northington et al. | | |
| 6,128,603 | A | 10/2000 | Dent et al. | | |
| 6,129,275 | A | 10/2000 | Urquhart et al. | | |
| 6,134,561 | A | 10/2000 | Brandien et al. | | |
| 6,145,738 | A | 11/2000 | Stinson et al. | | |
| 6,148,377 | A | 11/2000 | Carter et al. | | |
| 6,149,056 | A | 11/2000 | Stinson et al. | | |
| 6,164,528 | A | 12/2000 | Hills et al. | | |
| 6,167,386 | A | 12/2000 | Brown | | |
| 6,175,823 | B1 | 1/2001 | Van Dusen | | |
| 6,178,409 | B1 | 1/2001 | Weber et al. | | |
| 6,189,787 | B1 | 2/2001 | Dorf | | |
| 6,193,152 | B1 | 2/2001 | Fernando et al. | | |
| 6,193,155 | B1 | 2/2001 | Walker et al. | | |
| 6,199,761 | B1 | 3/2001 | Drexler | | |
| 6,202,054 | B1 | 3/2001 | Lawlor et al. | | |
| 6,206,283 | B1 | 3/2001 | Bansal et al. | | |
| RE37,122 | E | 4/2001 | Levine et al. | | |
| 6,216,227 | B1 | 4/2001 | Goldstein et al. | | |
| 6,223,166 | B1 | 4/2001 | Kay | | |
| 6,223,168 | B1 | 4/2001 | McGurl et al. | | |
| 6,246,996 | B1 | 6/2001 | Stein et al. | | |
| 6,247,047 | B1 | 6/2001 | Wolff | | |
| 6,260,024 | B1 | 7/2001 | Shkedy | | |
| 6,263,446 | B1 | 7/2001 | Kausik et al. | | |
| 6,269,369 | B1 | 7/2001 | Robertson | | |
| 6,275,829 | B1 | 8/2001 | Angiulo et al. | | |
| 6,282,522 | B1 | 8/2001 | Davis et al. | | |
| 6,286,756 | B1 | 9/2001 | Stinson et al. | | |
| 6,289,322 | B1 | 9/2001 | Kitchen et al. | | |
| 6,292,789 | B1 | 9/2001 | Schutzer | | |
| 6,305,604 | B1 | 10/2001 | Ono | | |
| 6,308,887 | B1 | 10/2001 | Korman et al. | | |
| 6,314,169 | B1 | 11/2001 | Schelberg, Jr. et al. | | |
| 6,317,745 | B1 | 11/2001 | Thomas et al. | | |
| 6,321,211 | B1 | 11/2001 | Dodd | | |
| 6,321,984 | B1 | 11/2001 | McCall et al. | | |
| 6,321,987 | B1 | 11/2001 | Watanabe et al. | | |
| 6,327,348 | B1 | 12/2001 | Walker et al. | | |
| 6,327,570 | B1 | 12/2001 | Stevens | | |
| 6,327,575 | B1 | 12/2001 | Katz | | |
| 6,334,108 | B1 | 12/2001 | Deaton et al. | | |
| 6,343,279 | B1 | 1/2002 | Bissonette et al. | | |
| 6,347,305 | B1 | 2/2002 | Watkins | | |
| 6,360,254 | B1 | 3/2002 | Linden et al. | | |
| 6,367,693 | B1 | 4/2002 | Novogrod | | |
| 6,370,240 | B1 | 4/2002 | Woynoski et al. | | |
| 6,386,444 | B1 | 5/2002 | Sullivan | | |
| 6,394,343 | B1 | 5/2002 | Berg et al. | | |
| 6,408,284 | B1 | 6/2002 | Hilt et al. | | |
| 6,411,942 | B1 | 6/2002 | Fujimoto | | |
| 6,415,271 | B1 | 7/2002 | Turk et al. | | |
| 6,438,586 | B1 | 8/2002 | Hass | | |
| 6,449,599 | B1 | 9/2002 | Payne et al. | | |
| 6,453,300 | B2 | 9/2002 | Simpson | | |
| 6,473,500 | B1 | 10/2002 | Risaf et al. | | |
| 6,484,936 | B1 | 11/2002 | Nicoll et al. | | |
| 6,488,203 | B1 | 12/2002 | Stoutenburg et al. | | |
| 6,502,745 | B1 | 1/2003 | Stimson et al. | | |
| 6,502,747 | B1 | 1/2003 | Stoutenburg et al. | | |
| 6,510,453 | B1 | 1/2003 | Apfel et al. | | |
| 6,526,130 | B1 | 2/2003 | Paschini | | |
| 6,539,363 | B1 | 3/2003 | Allgeier et al. | | |
| 6,547,132 | B1 | 4/2003 | Templeton et al. | | |
| 6,549,119 | B1 | 4/2003 | Turner | | |
| 6,554,184 | B1 | 4/2003 | Amos | | |
| 6,575,358 | B2 | 6/2003 | O'Callaghan et al. | | |
| 6,601,038 | B1 | 7/2003 | Kolls | | |
| 6,609,113 | B1 | 8/2003 | O'Leary et al. | | |
| RE38,255 | E | 9/2003 | Levine et al. | | |
| 6,618,705 | B1 | 9/2003 | Wang et al. | | |
| 6,736,314 | B2 | 5/2004 | Cooper et al. | | |
| 6,761,309 | B2 | 7/2004 | Stoutenburg et al. | | |
| 6,761,311 | B1 | 7/2004 | Algiene et al. | | |
| 6,814,282 | B2 | 11/2004 | Seifert et al. | | |
| 6,827,260 | B2 | 12/2004 | Stoutenburg et al. | | |
| 6,829,588 | B1 | 12/2004 | Stoutenburg et al. | | |
| 6,847,947 | B1 | 1/2005 | Kambour et al. | | |
| 6,854,651 | B2 | 2/2005 | Smith et al. | | |
| 6,886,742 | B2 | 5/2005 | Stoutenburg et al. | | |
| 6,908,031 | B2 | 6/2005 | Seifert et al. | | |
| 6,922,673 | B2 | 7/2005 | Karas et al. | | |
| 6,938,013 | B1 | 8/2005 | Guiitierrez-Sheris | | |
| 7,092,916 | B2 | 8/2006 | Diveley et al. | | |
| 7,103,577 | B2 | 9/2006 | Blair et al. | | |
| 7,104,440 | B2 | 9/2006 | Hansen et al. | | |
| 7,107,249 | B2 | 9/2006 | Diveley et al. | | |
| 7,158,955 | B2 | 1/2007 | Diveley et al. | | |
| 7,182,252 | B1 | 2/2007 | Cooper et al. | | |
| 7,195,151 | B2 * | 3/2007 | Licciardello et al. | | 235/379 |
| 2001/0032878 | A1 | 10/2001 | Tsiounis et al. | | |
| 2001/0051876 | A1 | 12/2001 | Seigel et al. | | |
| 2001/0054003 | A1 | 12/2001 | Chien et al. | | |
| 2002/0007320 | A1 | 1/2002 | Hogan et al. | | |
| 2002/0016769 | A1 | 2/2002 | Barbara et al. | | |
| 2002/0023055 | A1 | 2/2002 | Antognini et al. | | |
| 2002/0032653 | A1 | 3/2002 | Schutzer | | |
| 2002/0046106 | A1 | 4/2002 | Ishibashi et al. | | |
| 2002/0046116 | A1 | 4/2002 | Hohle et al. | | |
| 2002/0062285 | A1 | 5/2002 | Amann | | |
| 2002/0076018 | A1 | 6/2002 | Banks et al. | | |
| 2002/0087337 | A1 | 7/2002 | Hensley | | |
| 2002/0087462 | A1 | 7/2002 | Stoutenburg et al. | | |
| 2002/0087463 | A1 | 7/2002 | Fitzgerald et al. | | |
| 2002/0087467 | A1 | 7/2002 | Mascavage et al. | | |
| 2002/0087469 | A1 | 7/2002 | Ganesan et al. | | |
| 2002/0104026 | A1 | 8/2002 | Barra et al. | | |
| 2002/0111908 | A1 | 8/2002 | Milberger et al. | | |
| 2002/0143566 | A1 | 10/2002 | Diveley et al. | | |
| 2002/0143706 | A1 | 10/2002 | Diveley et al. | | |
| 2002/0143709 | A1 | 10/2002 | Diveley et al. | | |
| 2002/0152168 | A1 | 10/2002 | Neofytides et al. | | |
| 2002/0152176 | A1 | 10/2002 | Neofytides et al. | | |
| 2002/0153414 | A1 | 10/2002 | Stoutenburg et al. | | |
| 2002/0161702 | A1 | 10/2002 | Milberger et al. | | |
| 2002/0169719 | A1 | 11/2002 | Dively et al. | | |
| 2002/0174016 | A1 | 11/2002 | Cuervo | | |
| 2002/0195486 | A1 | 12/2002 | Erb et al. | | |
| 2003/0014371 | A1 | 1/2003 | Turgeon | | |
| 2003/0024979 | A1 | 2/2003 | Hansen et al. | | |
| 2003/0028491 | A1 | 2/2003 | Cooper | | |
| 2003/0053609 | A1 * | 3/2003 | Risafi et al. | | 379/114.2 |
| 2003/0055689 | A1 | 3/2003 | Block et al. | | |
| 2003/0055780 | A1 | 3/2003 | Hansen et al. | | |
| 2003/0061171 | A1 | 3/2003 | Gilbert et al. | | |
| 2003/0069856 | A1 | 4/2003 | Seifert et al. | | |
| 2003/0111529 | A1 | 6/2003 | Templeton et al. | | |
| 2003/0120777 | A1 | 6/2003 | Thompson et al. | | |
| 2003/0126036 | A1 | 7/2003 | Mascavage et al. | | |
| 2003/0126075 | A1 | 7/2003 | Mascavage et al. | | |
| 2003/0126083 | A1 | 7/2003 | Seifert et al. | | |
| 2003/0130907 | A1 | 7/2003 | Karas et al. | | |
| 2003/0130940 | A1 | 7/2003 | Hansen et al. | | |
| 2003/0130948 | A1 | 7/2003 | Algiene et al. | | |
| 2003/0135459 | A1 | 7/2003 | Abelman et al. | | |
| 2003/0149662 | A1 | 8/2003 | Shore | | |
| 2003/0154164 | A1 | 8/2003 | Mascavage et al. | | |
| 2003/0167237 | A1 | 9/2003 | Degen et al. | | |
| 2003/0177067 | A1 | 9/2003 | Cowell et al. | | |
| 2003/0187789 | A1 | 10/2003 | Karas et al. | | |
| 2003/0187791 | A1 | 10/2003 | Weichert et al. | | |
| 2003/0187792 | A1 | 10/2003 | Hansen et al. | | |
| 2003/0195811 | A1 | 10/2003 | Hayes et al. | | |
| 2003/0208445 | A1 | 11/2003 | Compiano | | |
| 2003/0222135 | A1 | 12/2003 | Stoutenburg et al. | | |

| | | | |
|---|---|---|---|
| 2003/0222136 | A1 | 12/2003 | Bolle et al. |
| 2003/0225689 | A1 | 12/2003 | MacFarlane et al. |
| 2004/0007618 | A1 | 1/2004 | Oram et al. |
| 2004/0015438 | A1 | 1/2004 | Compiano |
| 2004/0024701 | A1 | 2/2004 | Hansen et al. |
| 2004/0059672 | A1 | 3/2004 | Baig et al. |
| 2004/0068437 | A1 | 4/2004 | McGee et al. |
| 2004/0078327 | A1 | 4/2004 | Frazier et al. |
| 2004/0088248 | A1 | 5/2004 | Cutler |
| 2004/0088261 | A1 | 5/2004 | Moore et al. |
| 2004/0098328 | A1 | 5/2004 | Grant et al. |
| 2004/0098335 | A1 | 5/2004 | Michelsen |
| 2004/0107165 | A1 | 6/2004 | Blair et al. |
| 2004/0117302 | A1 | 6/2004 | Weichert et al. |
| 2004/0138947 | A1 | 7/2004 | McGee et al. |
| 2004/0139008 | A1 | 7/2004 | Muscavage et al. |
| 2004/0143552 | A1 | 7/2004 | Weichert et al. |
| 2004/0148286 | A1 | 7/2004 | Rogers |
| 2004/0153398 | A1 | 8/2004 | Baumgartner et al. |
| 2004/0158521 | A1 | 8/2004 | Newton et al. |
| 2004/0164145 | A1* | 8/2004 | Licciardello et al. ........ 235/381 |
| 2004/0167860 | A1 | 8/2004 | Baxter et al. |
| 2004/0193897 | A1 | 9/2004 | Van Volkenburgh |
| 2004/0205023 | A1* | 10/2004 | Hafer et al. .................. 705/43 |
| 2004/0210476 | A1 | 10/2004 | Blair et al. |
| 2004/0210506 | A1 | 10/2004 | Algiene et al. |
| 2004/0210521 | A1 | 10/2004 | Crea et al. |
| 2004/0210523 | A1 | 10/2004 | Gains et al. |
| 2004/0211831 | A1 | 10/2004 | Stoutenburg et al. |
| 2004/0254833 | A1 | 12/2004 | Algiene et al. |
| 2005/0004702 | A1 | 1/2005 | McDonald |
| 2005/0017607 | A1 | 1/2005 | Weinberger |
| 2005/0107152 | A1 | 5/2005 | McGee et al. |
| 2005/0167481 | A1 | 8/2005 | Hansen et al. |
| 2005/0177716 | A1 | 8/2005 | Gintern et al. |
| 2005/0180550 | A1 | 8/2005 | McGee et al. |
| 2005/0187929 | A1 | 8/2005 | Staggs |
| 2005/0209958 | A1 | 9/2005 | Michelsen |
| 2005/0209961 | A1 | 9/2005 | Michelsen |
| 2005/0251440 | A1 | 11/2005 | Bednarek |
| 2006/0144927 | A1 | 7/2006 | Love |
| 2007/0063021 | A1 | 3/2007 | Chakiris et al. |
| 2007/0187484 | A1 | 8/2007 | Cooper et al. |

FOREIGN PATENT DOCUMENTS

| | | | |
|---|---|---|---|
| EP | 949596 | A2 | 10/1999 |
| EP | 1077436 | A2 | 2/2001 |
| WO | WO 00/22559 | A1 | 4/2000 |
| WO | WO 00/46725 | A1 | 8/2000 |
| WO | WO 00/67177 | A2 | 11/2000 |
| WO | WO 01/04816 | A1 | 1/2001 |
| WO | WO 02/05195 | A1 | 1/2002 |

OTHER PUBLICATIONS

Internet article "Send Money by Credit Card" available on Sep. 7, 2007 at http://www.moneytransfer.ie and copyright 2003.*
"Western Union Quick Collect"; 2 pages.
About Western Union: Company History; http://www.payment-solutions.com/history.html, 2005, 2 pages.
Aeromexico and Western Union Partner to Offer a Cash Payment Option for Booking Airline TIckets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Express Unit Introduces State-Of-The-Art Automated Money Order Dispenser; 1990, Tri-State Food News, 1 page.
American Greeting Cards Click-Through; no date, 38 pages.
AmeriNet, Inc.: "The Best Idea in Payment Systems since the Credit Card", http://www.debit-it.com/, printed Feb. 7, 2000, 8 pages.
Amex aims expansion strategy at local currency exchanges; 1990 Crain's Chicago Business 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Andrejczak, Matt, "A Virginia start-up is reaching", Dialog File, American Banker-v164-date May 17, 1999 pp. 2.
Announcing Quick Collect Online; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company; 1873, pp. 8-11.
Annual Report of the President of the Western Union Telegraph Company; 1874, pp. 8-11.
Annual Report of the Western Union Corporation; 1990, 4 pages.
Annual Report of the Western Union Telegraph Co 1975 3 Pages.
Annual Report of the Western Union Telegraph Company, 1940b, 4 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951 2 pages.
Annual Report of the Western Union Telegraph Company; 1981, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1978, 3 pages.
AT&T Wireless to Offer Western Union SwiftPay as Replenishment Option for AT&T Free2Go Wireless Prepaid Customers; 2001, PR Newswire Association, 2 pages.
Behind the Scenes of Life; 1996, First Data Corporation Annual Report, 3 pages.
Bidpay.com: Whois search results; 2003, http://www.networksolutions.com/en_US/whois/results.jhtml;jsessionid+VZDZVYDD1J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.
Boneh, Dan "Beaming Money by Email is Web's Next killer App", PR Newswire, Nov. 16, 1999, pp. 1-4.
Business Wire, "E-Commerce, Email and E-greeting Cards Combine in New Web Site Designed by Interactive Bureau", Sep. 14, 1999 (abstract), [online] [retrieved on May 1, 2002], retrieved from Proquest Database, 2 pages.
Candygram payment service, no date, 1 page.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.

Confinity, Inc. PayPal.com, How PayPal.com Works, download from website http://www.paypal.com on Feb. 7, 2000, 7 pages.
Dotbank, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Releases, 3 pages.
Federal Benefits Checks are Going Away-Don't Let Your Customers Go with Them: Announcing the Western Union Benefits Quick Cash Program; 4 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996; First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996; First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996; First Virtual Holdings Corporation News Release, 3 pages.
First located example of a money transfer; Aug. 25, 1873, 1 page.
Get your Collect Card; 1939, Dots and Dashes, 2 pages.
Greenia-1952 Website computermuseum.li—Lexikon Services 1982 2002-2003 pp. 3.
Guess What? The check's not in the mail; 2001, Western Union's Professional Collector, 3 pages.
Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
How money by phone was paid; Money Transfer Service: Book of Rules and List of Offices; 1926, Western Union Telegraph Company, 3 pages.
Idealab Company, "PayMe.com," download from website http://ssl.idealab.com on Feb. 16, 2000, 7 pages.
If you're not getting your payment with Quick Collect, chances are you're not getting it; 2001; 2 pages.
Intell-A-Check Corp-http://www.icheck.com web site, printed date Feb. 7, 2000, 7 Pages.
Introducing the Western Union Cash Card Program; 1998, 2 pages.
It takes a certain person to make a good collector. But it takes a good manager to make a champion; 2001, Western Union's Professional Collector, 3 pages.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages
Latour, Almar "PayPal Electronic Plan May be On the Money in Years to Come", The Wall Street Journal Interactive Edition, Nov. 15, 1999, downloaded from www.paypal.com/html/wsj.html, 2 pages.
Lawton, George; "Biometrics: A New Era in Security"; 1998, Computer, vol. 31, No. 8, pp. 16-18.
Leading Provider of Transaction Card Processing Selects Connect Oneserver Software as a Solution, http://www.oneserver.com web site, May 17, 1996, 5 pages.
Levin, Gary; "Western Union not fading into sunset; new services are added as telegrams drop"; 1992, 2 pages.
List of Prepaid Services; http://www.westernunion.com/info/osComparePrePaid.asp, 1 page.
Loved one stranded? Send Cash; 1991, Akron Beacon Journal, 2 pages.
Luxury Brands LLC: World Famous Brands at Liquidation Process; http://www.auctionbytes.com/cab/pages/payment, 3 pages.

McEnaney, McEnaney, "Modular ATM Gives Boost to Diebold", -DIALCG File 01896530-Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948; 1 page.
Money Orders by Phone; 1935, Fortune Magazine, 3 pages.
MoneyZap.com Greeting Card Process Flow; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
Netscape Announces Netscape Livepayment to Facilitate Internet Commerce, May 13, 1996, 5 pages.
New Western Union SwiftPay Service Continues Expansion of Consumer to Business Payment Option, PR Newswire Association, Inc., Oct. 29, 1999 2 pages.
NTS Completes Merger wtih EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2003; 2 pages.
PayPal.com Case Study; http://fox.rollins.edu/~slackman/PayPal.htm, 2003, 7 pages.
PayPal: The way to send and receive money online; 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal "Beam Me Up Some Cash" Silicon Valley Insider, Sep. 8, 1999, www.halplotkin.com/cnbcs029.htm, 3 pages.
PR Newswire Association, Inc.—Western Union Financial Services forms—Aug. 22, 1991, 1 page.
PR Newswire, "GiftSpot.com Simplifies Gift-Giving on the Internet," Oct. 20, 1999(abstract), [online] retrieved on May 1, 2002], retrieved from PROQUEST Database, 5 pages.
Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, no date, 2 pages.
Purchasing American Airlines Tickets Just Got Easier; 2005, 4 pages.
Quick Cash and Quick Collect: Western Union's money-movers; 1990, Newsbriefs, vol. 2, No. 1, 3 pages.
Quick Cash: A safe and reliable way to send funds around the world; http://www.payment-solutions.com/quickcash.html, 1 page.
Quick Collect Sales Presentation; Jan. 2004, 28 pages.
Quick Collect: Government/Child Support Agency Name, Training Guide; 2004, 7 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.
Rhode Island becomes first state to accept child support payments at Western Union: More than 50 Western Union Convenience Pay Agent Locations Offer New Level of Convenience to Rhode Island Residents Who Pay Child Support—; 2002, 3 pages.
SBC Communications adds Western Union Locations for Walk-in Customer Bill Payments; SBC News Release, Sep. 7, 2005, 2 pages.
Seifert—Method & System for Electronic Transfer—FDC 0167PUS—21 pages.
Send your payment using Western Union Quick Collect; Feb. 2, 2004 2 pages.
Send Your Utility Bill Payment from Here!; no date 3 pages.

Sending Cash in a Flash: There are more ways to do it than you might think; 1991, 2 pages.
Sending Cash in a Flash; 1990, Travel & Leisure, p. 42.
Shopping Order service and gift service; 1934, Western Union Telegraph Company, Money Order Book, 6 pages.
Signature Services: Helping financial institutions send funds faster; http://www.payment-solutions.com/signature.html, 205, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina "PayPal Online Payment Service- Another Way to Pay for Auction Items" www.auctionbytes.com, Feb. 20, 2000, 4 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Stockel, Anna; "Securing Data and Financial Transactions"; 1995, Institute of Electrical and Electronics Engineers 29th Annual Conference, pp. 397-401.
Stoutenburg—Method & System for Performing Money Transfer Transactions—10-289802—30 Pages.
Survey of services; 1960, pp. 2-31.
The Western Union Telegraph Company: Delivery of Money Transfer Service; Apr. 1926, Commercial Bulletin No. 9-A pp. 4.
The Western Union Telegraph Company: Instructions for Receiving Clerks; 1929, Commercial Bulletin No. 37-A, 2 pages
The Yellow Blank is Correct for every social need; 1930, Western Union Booklet, 2 pages.
The Yellow Blank: When, Why, How to Use It; 1934, 5 pages.
To send a Quick Collect Payment; sample form, no date, 1 page.
Towson, MD., "VIPS Introduces MCSource to Managed Healthcare Industry", VIPS Healthcare Information Solutions, Mar. 7, 1996, 3 pages.
Transfers require ID made by telegraph; 1895, Tariff Book, 4 pages.
Transpoint, "The Way to Pay Online", downloaded from website http://www.transpoint.com/ on Feb. 10, 2000, 12 pages.
Tranz 330 Fast, "Low-Cost Transaction Automation At The Point Of Service," http://www.vfi-finance.com/tranz330.htm, VeriForne Finance, pp. 1-3, especially pp. 1-2, Jan. 1999.
VeriFone Finance, "Fast,Low-Cost Transaction Automation at the Point of Service", Jan. 1999—2 pages.
VisionPLUS Consumer Payment Solution Overview, no date, 2 pages.
Wermer Sandra; "A million credit card transactions in five hours"; 1997 Primeur, 2 pages.
Western Union—Quarterly Report 3rd Quarter 1975—4 pages.
Western Union—Some Quick Facts about Quick Collect; no date, p. 1.
Western Union- "Now, using our service is even more rewarding" 4 pages.
Western Union and Continental Airlines Introduce New Quick and Easy Cash Payment Option When Booking Flights; 2004, Press Release, 4 pages.
Western Union Creates Phone Card with BLT Technologies; 1997, PR Newswire Association, 2 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Gift Greetings; no date, 6 pages.
Western Union Hotel-Motel Reservation Service, no date, 1 page.
Western Union Money Orders More Popular Than Ever: 1942, Dots and Dashes, vol. 18, No. 3, 2 pages.
Western Union Money Transfer & more—9 pages.
Western Union -Money Transfer Service- Feb. 1, 1920 10th Edi—pp. 119 & 120.
Western Union Money Transfer Services, Send Money Online, Money Orders, Printed date Nov. 3, 2005, 3 pages.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect, "There's a lot to be said about the many advantages of the Quick Collect service and look who's saying it", 1995, 4 pages.
Western Union Quick Collect: First Data Corporation; 2000-2001,2004; 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: In Person, Online or by Phone!; no date, 2 pages.
Western Union Some Quick Facts about Quick Collect, https://quickfind,Westernunion.com., p. 1.
Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
Westwood, Mass, "Strean, LitleNet, BBN, and KPMG Announce Industry-Wide Initiative to Enable Wide-Scale Software Electronic Commerce" Stream International Inc., and LitleNet, May 7, 1996, 7 pages.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene "You've got Money?", Bank Technology News, Jun. 2000, pp. 1-4, vol. 13, Issue 6, New York.
x.com, "Do More with Your Money," download from website http://www.x.com., 5 pages, Feb. 7, 2000.
XP-002347909-Western Union Announces ATM Card Payout for Money Transfer Transactions—Oct. 22, 2001 p. 1.
You're sending more than a payment: Point-of-Sale & Merchandising Support Advertising Materials, no date, 2 pages.
You're sending more than a payment: You're sending peace of mind; 2004, 3 pages.

* cited by examiner

MONEY TRANSFER CARDS, SYSTEMS AND METHODS

BACKGROUND OF THE INVENTION

The present invention relates generally to the field of money transfers, and in particular to money transfer cards, systems and methods to initiate, facilitate, process and/or perform money transfers.

Present money transfer procedures typically involve an individual going to a money transfer location, such as a Western Union location, and giving the customer service agent a variety of personal information. This personal information may include the names and addresses of the sender and recipient, proof of identification, and the amount to be transferred. This information is entered into a money transfer system, and used to create a record of the money transfer. Once the money to be transferred has been collected from the sender, the recipient then proceeds to a separate money transfer location, such as another Western Union location, to pick up the money. The recipient may be required to provide a money transfer number and/or proof of identification, prior to picking up the money. Typically, this procedure is followed for each subsequent money transfer, even when the sender and recipient are the same. As a result, people who frequently send money using money transfer systems are repeatedly providing much of the same information, and making trips to offices or locations designated for money transfers. Further, money transfers typically must be initiated and completed by direct interaction between the customer and the money transfer organization. Improvements are desired.

BRIEF SUMMARY OF THE INVENTION

The present invention relates generally to the field of money transfers, and in particular to money transfer cards, systems and methods to initiate, facilitate, process and/or perform money transfers. Methods of the present invention will be particularly useful for initiating money transfers "in-lane," such as while shopping at a retail outlet. In this manner, the customer can initiate the money transfer will attending to other shopping or errands, or while at a location not designated solely for money transfers.

In one embodiment of the present invention, a method of facilitating money transfers includes establishing a money transfer record and receiving, from a vendor location, a money transfer activation request associated with the money transfer record. The method includes receiving a fulfillment request associated with the money transfer record, collecting a customer data set, and authorizing a money transfer associated with the money transfer record. The money transfer is facilitated by the creation of a money transfer record, which may occur prior to the money transfer activation request. The customer then can initiate the money transfer while at the vendor location. The money transfer record includes, in some embodiments, a money transfer amount, an account identifier and a code. In this embodiment, receipt of the fulfillment request may include receiving the account identifier and the code from a money transfer customer. The fulfillment request may be received by a customer service representative (CSR), an interactive voice response unit (IVR), a website, or the like.

In one aspect, the method includes associating a money transfer card with the money transfer record, and providing the money transfer card to the vendor location. In another aspect, the receipt of the money transfer activation request includes receiving an account identifier associated with the money transfer record, with the account identifier disposed on the money transfer card. In this manner, a money transfer record may be created, and the money transfer may be initiated or requested using a money transfer card available for purchase at the vendor location. The vendor location, which may include a point-of-sale device and may be a retail outlet, vendor or merchant (e.g., grocery store, gas station, shopping mall, airport, or the like), can be used to facilitate a money transfer between customers.

In some aspects, the activation request includes a money transfer amount and a money transfer fee. The money transfer fee may be a fixed fee (e.g., a set dollar amount per money transfer), or a variable fee (e.g., a percentage of the dollar amount being transferred). The activation request may further include an account identifier, a customer name, and the like. In some embodiments the activation request further includes a payment or payment record. Further, a plurality of money transfer records may be established, with each having an associated money transfer card. The money transfer cards then may be provided to a variety of retail or vendor locations for purchase by customers wanting to transfer money. The collected customer data set typically includes, in some aspects, the name of the money transfer initiator and/or the name of the money transfer recipient. The collected data also may include additional information on one or both parties, including addresses, telephone numbers, cell phone numbers, email addresses, social security numbers, dates of birth, driver license numbers, employee identification numbers, passwords, and the like.

In one aspect, authorizing the money transfer further includes providing a money transfer control number to a first customer associated with the customer data set. The dispensing of the money associated with the money transfer record may occur, for example, upon receipt of the money transfer control number from a second customer associated with the customer data set. In this manner, additional security measures are in place to ensure the correct party receives the transferred money.

In another embodiment of the present invention, a method of facilitating money transfers includes establishing a money transfer record and pairing the money transfer record with a money transfer card. The money transfer record and the money transfer card have an account identifier associated therewith. A money transfer activation request associated with the money transfer record is received, with the activation request including the account identifier. The method includes receiving a money transfer fulfillment request associated with the money transfer record, with the fulfillment request also including the account identifier. In some aspects, the method includes authorizing a money transfer to a money transfer recipient in an amount associated with the money transfer record.

The present invention further provides systems for initiating, processing, facilitating and/or performing money transfers. One such system includes a host computer system having a processor coupled to a database. The host computer system further includes code for performing various methods or method steps of the present invention. In a particular embodiment, the code includes code for establishing a money transfer record, for receiving a money transfer activation request associated with the money transfer record, for receiving a fulfillment request associated with the money transfer record and collecting a customer data set, and for authorizing a money transfer associated with the money transfer record. The host computer may further include code for associating a money transfer card with the money transfer record.

In some aspects, the system includes a point-of-sale device disposed at the vendor location. The point-of-sale device is adapted for receiving the money transfer activation request from the money transfer card and providing the money transfer activation request to the host computer system. In some aspects, the point-of-sale device receives an account identifier associated with the money transfer record from the money transfer card, and initiates the money transfer activation request. Initiation of the money transfer activation request may occur, in some aspects, when the point-of-sale device sends the account identifier to the host. In one aspect, the host computer system includes a first host computer having the code for establishing the money transfer record and a second host computer having the code for authorizing the money transfer associated with the money transfer record. In another aspect, the system includes code for collecting a customer data set and associating the customer data set with the money transfer record.

Other objects, features and advantages of the present invention will become more fully apparent from the following detailed description, the appended claims, and the accompanying drawings.

DETAILED DESCRIPTION OF THE INVENTION

The present invention includes systems and methods that initiate, facilitate, process and/or perform money transfers between customers. The embodiments of the present invention will be particularly useful for customers who want to send money without needing to physically go to a money transfer location, such as a Western Union office. The number of locations at which a money transfer can be initiated are increased through use of the systems and methods of the present invention. Some embodiments result in increased transaction speed and improved convenience to the customers.

Figure 1B:
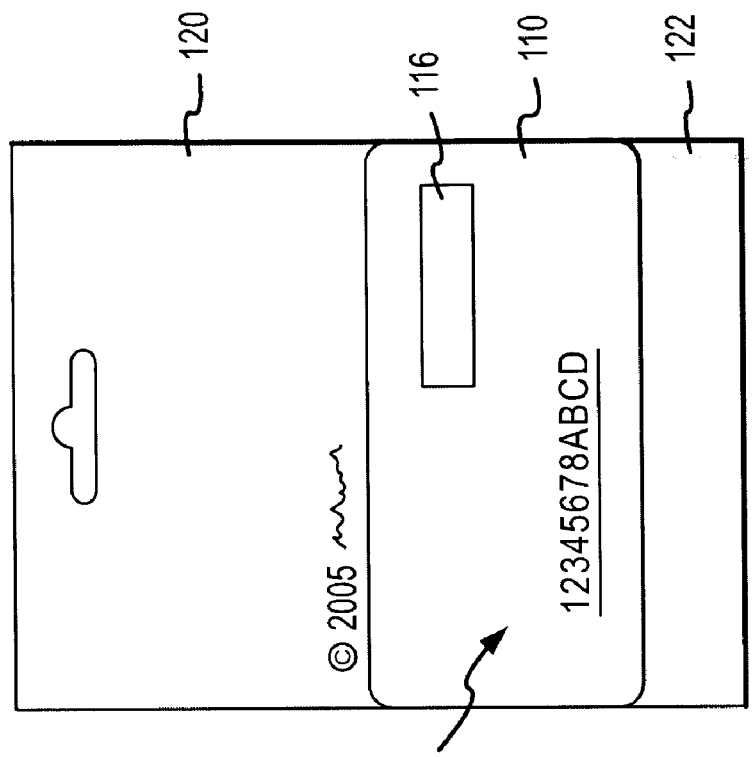
FIGS. 1A and 1B are simplified front and rear depictions, respectively, of a money transfer card assembly according to an embodiment the present invention.
Figure 1A:
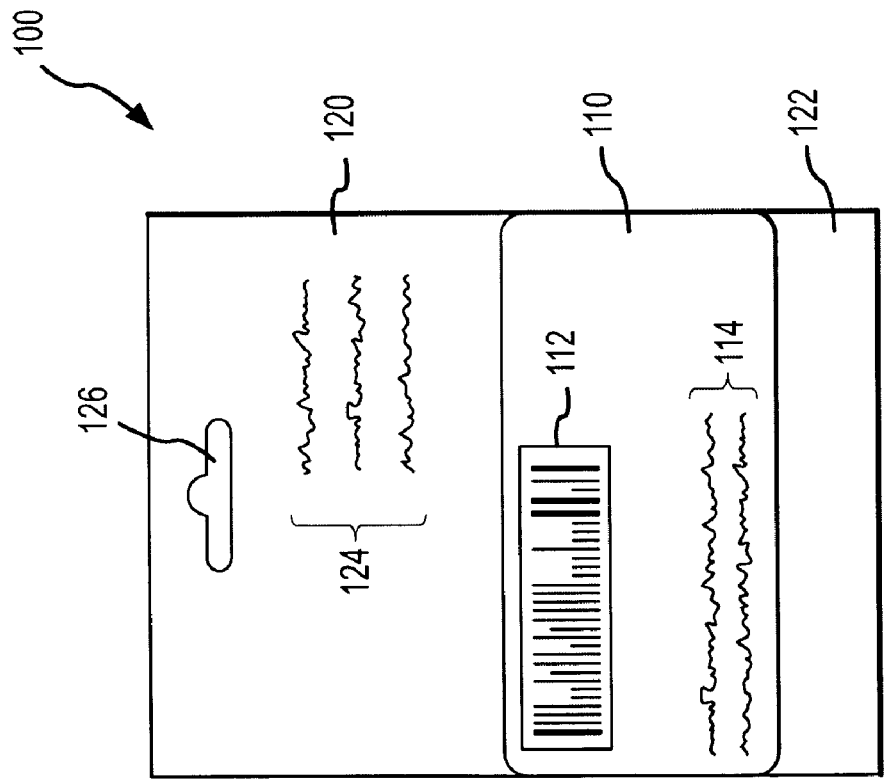

FIGS. 1A and 1B depict front and rear views of a money transfer card assembly 100 according to an embodiment of the present invention. Assembly 100 includes a first carrier portion 120 coupled to a money transfer card 110. In one embodiment, carrier portion 120 and money transfer card 110 are coupled along adjoining edges. First carrier portion 120 and money transfer card 110 may be formed from a single sheet of material with a score line separating carrier portion 120 and card 110. In one embodiment, a second carrier portion 122 is coupled to an opposing edge of card 110 as depicted in FIGS. 1A and 1B. It will be appreciated by those skilled in the art that money transfer card 110 may be coupled to carriers in alternative ways within the scope of the present invention. Other means for coupling carrier portion 120 and card 110 are described in U.S. Provisional Patent Application No. 60/638,079, entitled "Transaction Card Assemblies, Systems, and Methods of Making", filed Dec. 20, 2004, assigned to the assignee of the present invention, the complete disclosure of which is incorporated herein by reference. Further, in alternative embodiments of the present invention money transfer cards 110 are displayed and/or sold without a carrier or carrier portion.

First carrier portion 120 includes a space 124 acceptable for writing, images, or the like. In this manner, carrier portion 120 may be used to advertise money transfer card 110 coupled thereto and/or provide information on a money transfer transaction which can be imitated using card 110. Carrier portion 120 may further include a hole 126 disposed therethrough for hanging assembly 100 on a J-hook or other point-of-purchase display. In this manner, money transfer card assemblies 100 may be presented to potential customers near, for example, the checkout of various retail establishments.

As depicted in FIG. 1A, in one embodiment a front surface of money transfer card 110 also includes writing, images, or the like 114. This writing may include, for example, the value of the money transfer associated with card 110, the name of the money transfer organization (e.g., Western Union), a retailer or merchant name, or the like. In one embodiment, an account identifier 112 is disposed on or embossed into the surface of money transfer card 110. In one embodiment, the account identifier 112 is a uniform product code (UPC) that is readable by a point-of-sale device in use by various vendor locations. In this manner, a customer desiring to transfer money in a particular denomination can select an appropriate money transfer card assembly 100 corresponding to that denomination. The customer then presents money transfer card assembly 100 to a point-of-sale device or a clerk operating the point-of-sale device at the vendor location. The point-of-sale device reads account identifier 112 to charge the customer the designated amount for the purchase of money transfer card 110. In one embodiment, the customer is charged an amount associated with money transfer card 110, with that amount including the amount to be transferred and any money transfer fees. In another embodiment, the customer is charged a money transfer amount and a separate money transfer fee associated with the purchase of money transfer card 110. For example, in one embodiment, money transfer card 110 corresponds to a one hundred dollar ($100.00) money transfer, and the purchase of money transfer card assembly 100 costs nine dollars and ninety-five cents ($9.95) to reflect a money transfer fee.

As shown in FIG. 1B, in one embodiment the reverse side of money transfer card 110 includes an account or card identifier 118. In one embodiment, account identifier 118 is a string of alphanumeric characters. In some embodiments, account identifier 118 corresponds to account identifier 112 disposed on the front surface of card 110. In one embodiment, card 110 has only one account identifier 112, 118. Account identifiers 112, 118 may take a number of different forms within the scope of the present invention including, for example, a string of alphanumeric characters, a universal product code (UPC), a magnetic stripe and the like. In this manner, the purchaser of money transfer card assembly 100 has a designated account identifier associated with money transfer card 110 for subsequent fulfillment of the money transfer as further described below. In a particular embodiment, card 110 includes a code 116 disposed on the front or rear surface thereof. Code 116 may take a number of different forms within the scope of the present invention including, for example, a string of alphanumeric characters, a universal product code (UPC), and the like. Code 116 may be similar to a personal identification number, unique to the associated money transfer card 110. In a particular embodiment, code 116 is hidden under a scratch-off surface. In this manner, the customer purchases money transfer card assembly 100 at the vendor location prior to accessing code 116.

A particular advantage of some embodiments is the customer's ability to purchase money transfer card assembly 100 at a variety of vendor locations. Further, in some embodiments the vendor locations need not require special software nor will the clerk operating the point-of-sale device at the vendor location be required to enter detailed information on the card purchaser. In a particular embodiment, the software and hardware necessary to permit the purchase of card assembly 100 corresponds to or is similar to hardware and software adapted for the sale of stored value cards. The money transfer organization, in some embodiments, targets particular neighborhoods, regions, or the like with appropriate card assemblies 100. For example, in a largely Hispanic-speaking neighborhood the money transfer organization places money transfer card assemblies 100 having Spanish as the primary language thereon. In this manner, money transfer card assemblies 100 may be demographically marketed for increased sales. By studying money transfers initiated at the various vendor locations, the money transfer organization also may place money transfer denominations as appropriate. For example, if a particular store generates a large number of high dollar money transfers, a greater number of high denomination money transfer card assemblies 100 can be placed at that store.

Once money transfer card 110 has been purchased, the customer requests the fulfillment of the money transfer by communicating with a money transfer organization associated with card 110, such as Western Union. The money transfer fulfillment can be accomplished a number of ways within the scope of the present invention. For example, a first customer 130 may enter a money transfer location, such as a Western Union location, and provide relevant information to a customer service representative (CSR) for first customer 130 and a second customer 140 who is the intended recipient of the transferred money. In one embodiment, customer 130 requests fulfillment of the money transfer by providing account identifier 118 and/or code 116 to the CSR, IVR and/or money transfer organization website from card 110 previously purchased by customer 130. This may occur, for example, when first customer 130 is the sender of money for transactions between these two customers. The CSR enters the collected information into a computer-based system using appropriate software. In other embodiments, customer information is conveyed by telephone to a CSR or an interactive voice response (IVR) system, by mobile or wireless devices, or the like, in order to provide the fulfillment request for the money transfer.

Alternatively, the fulfillment request may be accomplished when first customer 130 enters customer information into a money transfer organization website, such as a Western Union website. In these embodiments, customer 130 provides the money transfer organization with account identifiers 112, 118, and/or code 116. The money transfer organization website also may prompt first customer 130 to provide further information such as a date of birth, a driver's license number, a password, or the like, to verify the individual's identity. The amount of information retrieved from customers 130 and/or 140 may be effected by the Patriot Act, or other federal, state, or local legislation.

During the fulfillment request process, in one embodiment first customer 130 is provided with a money transfer control identifier or number. The control identifier may take a variety of forms within the scope of the present invention, including being a string of alphanumeric characters. Providing the money transfer control number to first customer 130 may occur through a variety of mechanisms within the scope of the present invention. For example, the control number may be provided to first customer 130 when they request fulfillment of the money transfer associated with money transfer card 110. In another embodiment, money transfer control number is mailed to one or both customers 130, 140 in a fashion similar to the mailing of a personal identification number (PIN) commonly used with automated teller machine (ATM) cards. In another embodiment, the money transfer control number is emailed to customers 130 and/or 140. In still another embodiment, money transfer control number corresponds to code 116. Customer 140 provides the money transfer control number to the money transfer organization, and possibly other proof of identity, prior to receiving the transferred money.

In some embodiments, first customer 130 may determine that the money transfer associated with money transfer card 110 is to be sent to more than one customer, or is to be sent to a single customer in increments. For example, during the fulfillment request process first customer 130 indicates that the money transfer associated with the purchased money transfer card 110 is to be sent to more than one customer. In this embodiment, first customer 130 may receive more than one money transfer control identifier. For example, if the money transfer should be split between two recipients, first customer 130 may receive two money transfer control identifiers, one for each recipient to use when they attempt to receive the transferred funds. Similarly, first customer 130 may wish to send the money to one or more recipients, but have the money transfer be distributed over time. For example, first customer 130 may have purchased a five-hundred dollar ($500.00) money transfer card 110, but wishes to allow the recipient to receive one hundred dollars ($100.00) every week for five weeks. In this embodiment, one or more money transfer control identifiers may be provided to first customer 130 that, when presented by the money transfer recipient, helps indicate to the money transfer organization system that only a portion of the money transfer amount is to be released.

Figure 2:
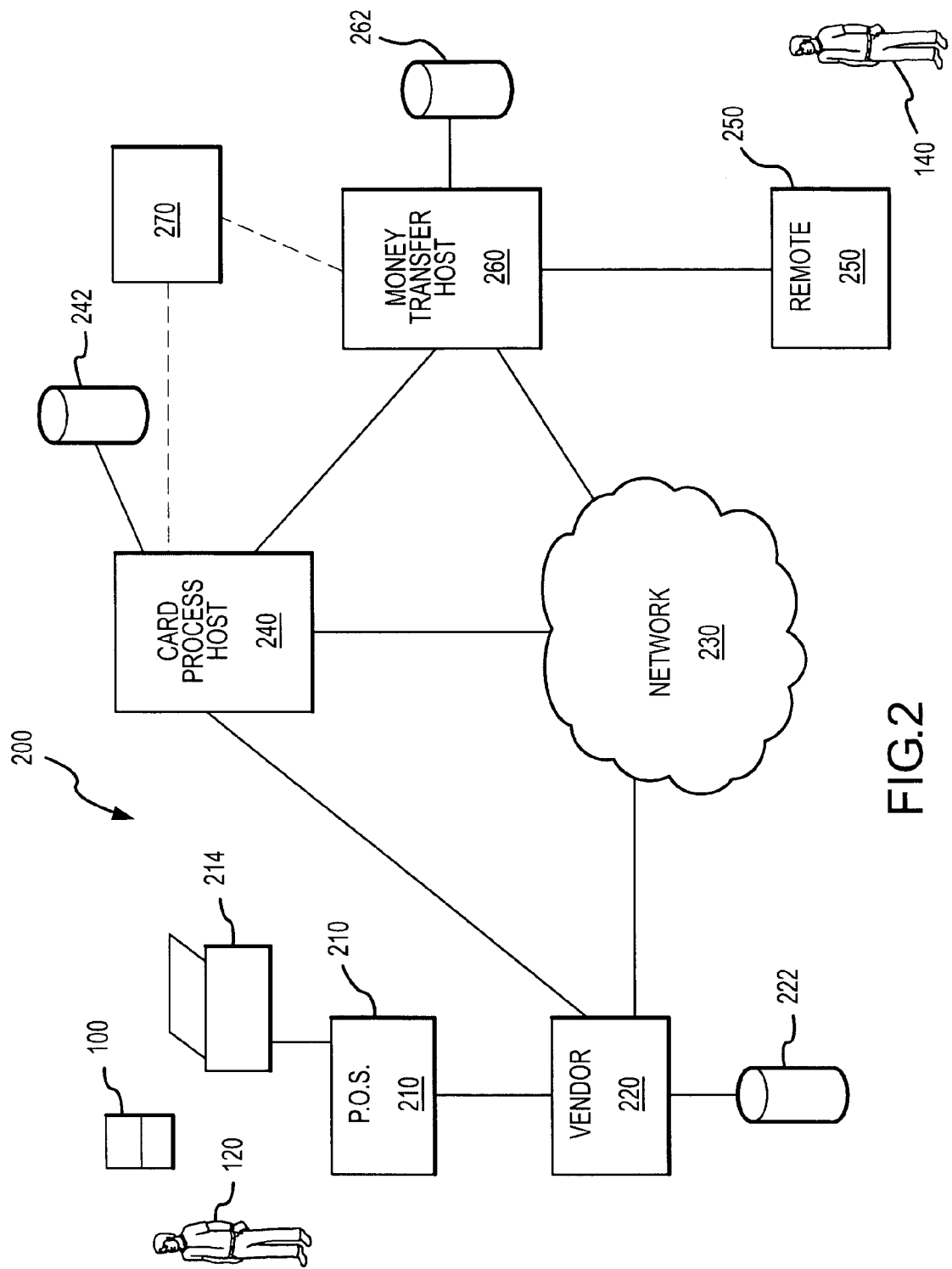
FIG. 2 is a simplified schematic system for facilitating money transfers according to an embodiment of the present invention.

Turning now to FIG. 2, a system 200 for initiating, facilitating, processing and/or performing money transfers according to embodiments of the present invention will be described. System 200 includes a card processing host computer system 240 coupled to a database 242. In one embodiment, card processing host system 240 comprises a server or other computer-based apparatus for creating and maintaining money transfer records associated with money transfer cards 110. Host system 240, in one embodiment, is operated by a third party such as Western Union or another money transfer organization. Database 242 maintains money transfer records, which may include money transfer card identifiers 112, 118, codes 116, and the money transfer amounts.

Card processing host computer system 240 may comprise or be coupled to a server maintaining a Western Union website 270 into which first customer 130 inputs money transfer fulfillment data. Similarly, host computer system 240 may have other user interfaces by which a customer service representative enters money transfer fulfillment information. For example, card processing host computer system 240 may include or be coupled to an interactive voice response system to allow customer 130 to request fulfillment of a money transfer.

System 200 further includes a money transfer host 260 and an associated database 262. Host 260 includes the hardware and software necessary to monitor, authorize, and process money transfers between first customer 130 and second customer 140. As shown in FIG. 2, money transfer host 260 may be coupled to card processing host 240 either directly or through a network 230. Network 230 may include telephone networks, credit card networks, wide area networks, the Internet, wireless networks, and the like. Further, depending on the type of processing device used to transmit the information, such devices may also be coupled to a financial network such as a credit card network or Automated Teller Machine (ATM) network, or may have a direct connection to other host computer systems. Further, money transfer host 260 may be coupled to website 270 or other interface mechanism that allows customer 130 and/or a CSR to interface with money transfer host 260 and card processing host 240.

In one embodiment, in order to receive the money, second customer 140 goes to a remote terminal or system 250. Remote system 250 may be a kiosk, a money transfer location such as a Western Union location, or the like. In one embodiment, remote system 250 also comprises a computer system, associated databases (not shown), and other necessary hardware and software in order to help coordinate the money transfers for customers 130 and 140. In one embodiment, remote computer system 250 is coupled to money transfer host computer system 260 so that database records maintained in database 262 are accessible by remote computer 250. This coupling between remote system 250 and host computer system 260 may be a direct coupling or may be a coupling through network 230 as depicted in FIG. 2.

While host computer systems 240 and 260 are depicted as separate systems, host computer systems 240 and 260 may comprise a single system. Host computer systems 240 and 260 also may have additional components than those depicted including, for example, multiple databases to facilitate the storage and retrieval of money transfer card 110 information and money transfer records associated therewith.

In some embodiments, portions of system 200 are found in retail outlets merchants, vendors, and the like, such as grocery stores, gas stations, shopping malls, airports, and the like. In one embodiment, a retail outlet has an associated vendor system 220 coupled to a database 222. Vendor system 220 also is coupled to a point-of-sale (POS) device or terminal 210. This coupling may be a direct coupling, or may be an electronic coupling through network 230. A direct coupling between vendor system 220 and point-of-sale device 210 may comprise, for example, a point-of-sale terminal 210 in a store location, physically or wirelessly coupled with vendor system 220. In some embodiments, vendor system 220 comprises a server, a computer, or the like, which may be located in a back room of the store or retail location.

Vendor system 220 and its associated database 222 may contain a wide variety of store-related records. For example, in some embodiments database 222 contains inventory lists, price lists, vendor lists, employee information and the like. In a particular embodiment, point-of-sale device 210 exists in a grocery store having a plurality of items available for consumers to purchase. Typically, such a point-of-sale device forms part of a cash register system in which the customer, or a clerk or employee of the store, scans item UPC's or item information into point-of-sale device 210. Point-of-sale device 210 receives the costs associated with those items from vendor system 220. Point-of-sale device 210 then accumulates a total cost of all items to be purchased by first customer 130 and presents the total to customer 130. First customer 130 will then tender payment for the desired items and depart the store location. If the payment is rendered using a credit card, a personal check, or the like, a payment authorization process may occur before the customer departs with the desired items. This authorization may involve standard credit card authorization or check authentication as known to those skilled in the art. Customer 130 also may pay by cash, money order, travelers check, or the like.

In some embodiments, vendor system 220 does not reside at a store location, but instead resides at a regional location. For example, a grocery store chain may have a single regional vendor system 220 maintaining records of store inventory, and costs and prices associated with items sold therein. The point-of-sale terminals 210 in one or more store locations are coupled to vendor system 220. In this manner, inventory and prices can be managed on a regional level in addition to a store by store manner. In still another embodiment, vendor system 220 is a third party owned system used to facilitate various transactions. In some cases, vendor system 220 resides at a third party transaction processing facility.

In some embodiments, point-of-sale terminal(s) 210 communicate with vendor system 220 through network 230. Point-of-sale devices 210 that may be used to capture, transmit and/or receive information to and from host computer system 220 for some embodiments of the present invention are further described in copending U.S. application Ser. No. 10/116,689, entitled Systems and Methods for Performing Transactions at a Point-of-Sale, filed Apr. 3, 2002, and assigned to the assignee of the present invention, the complete disclosure of which is herein incorporated by reference.

In some cases first customer 130 purchases items at the store using the above-noted procedure, but also wants to initiate a money transfer to second customer 140. In some embodiments of the present invention, system 200 is adapted to allow first customer 130 to initiate a money transfer at the store location using point-of-sale terminal 210. In a particular embodiment, customer 130 selects a money transfer card assembly 100 and presents the assembly 100 to either point-of-sale terminal 210 or a clerk operating point-of-sale terminal 210. In one embodiment, account identifier 112 and/or 118 is read from card 110 by POS device 210 and sent to card processing host 240. In this manner, host 240 is informed that the money transfer associated with card 110 is being requested. In some embodiments, host 240 returns an authorization to POS device 210 to allow the sale of card 110 to be completed. In other embodiments, the cost of card 110, which in some embodiments includes both the transfer amount and a money transfer fee, are read by POS device 210.

POS device 210, or the clerk operating POS device 210, then collects the money from customer 130 for money transfer card assembly 100. In some embodiments the amount to be charged customer 130 is displayed on card assembly 100. In other embodiments, host system 240 returns a money transfer authorization to POS device 210 which includes the amount to be charged the customer. In some embodiments, the money transfer amount is collected from customer 130, and any money transfer fees are deducted from the collected amount. In other embodiments, POS device 210 is instructed by host system 240 to collect a money transfer fee in addition to the money transfer amount associated with card assembly 100. In some embodiments, the money transfer fee is a variable amount such as a percentage of the money transfer amount. The collection of the fee would be similar to applying a sales tax to an item being purchased at POS device 210. In other embodiments, the money transfer fee is a fixed amount (e.g., five dollars per transfer). Additional money transfer fees may be used in alternative embodiments, such as a sliding fee scale (e.g., a five dollar fee for every one hundred dollars transferred, with a maximum fee of fifty dollars). In some embodiments, vendor system 220 maintains a money transfer fee schedule. The money transfer fee may include a fee to be paid the operator(s) of host system 240, 260, and may include a fee to be paid to the operator of vendor system 220.

In one embodiment, host system 240 and associated database 242 maintains some or all of the money transfer card records. In this embodiment, point-of-sale terminal 210 communicates via network 230 to host computer 240 in order to initiate or facilitate money transfers. In one embodiment, appropriate software is maintained on host computer 240, host computer 260, and/or remote computer 250 or their associated databases 242, 262 to perform the money transfer process. Additional details on some methods according to the present invention will be described in conjunction with FIG. 3.

When customer 130 tenders payment for items purchased at the store and/or for a money transfer, this payment may require further authorization. For example, if customer 130 is paying with a credit card, a standard credit card authorization may be performed using point-of-sale terminal 210. Similarly, if customer 130 is paying with a personal check, a check authentication process may be performed at point-of-sale terminal 210. In some embodiments, customer 130 will be tendering payment only for the money transfer. In other embodiments, customer 130 will be tendering payment for the money transfer and also additional items purchased at the store location operating point-of-sale terminal 210. In this manner, customer 130 may accomplish multiple tasks by, for example, purchasing desired groceries or other items available at a store as well as initiating a money transfer.

In some embodiments, payment received by point-of-sale terminal 210 for money transfers is forwarded to card processing host system 240 or money transfer host system 260 using an Automated Clearing House (ACH) system and process, the Western Union Money Transfer System, or another money transfer system. In some embodiments, host systems 240, 260 control or help control the ACH process for payments received from customer 130 that are associated with money transfers. In this manner, host computers 240, 260 may control the money transfer process so that money collected by point-of-sale terminal 210 is made available to second customer 140 associated with the purchased money transfer card 110. Additional details on money transfers for use with the present invention may be found in U.S. application Ser. No. 10/206,661, filed Jul. 26, 2002, entitled Money Transfer Systems and Methods for Travelers, and assigned to the assignee of the present, the complete disclosure of which is herein incorporated by reference.

Figure 3:
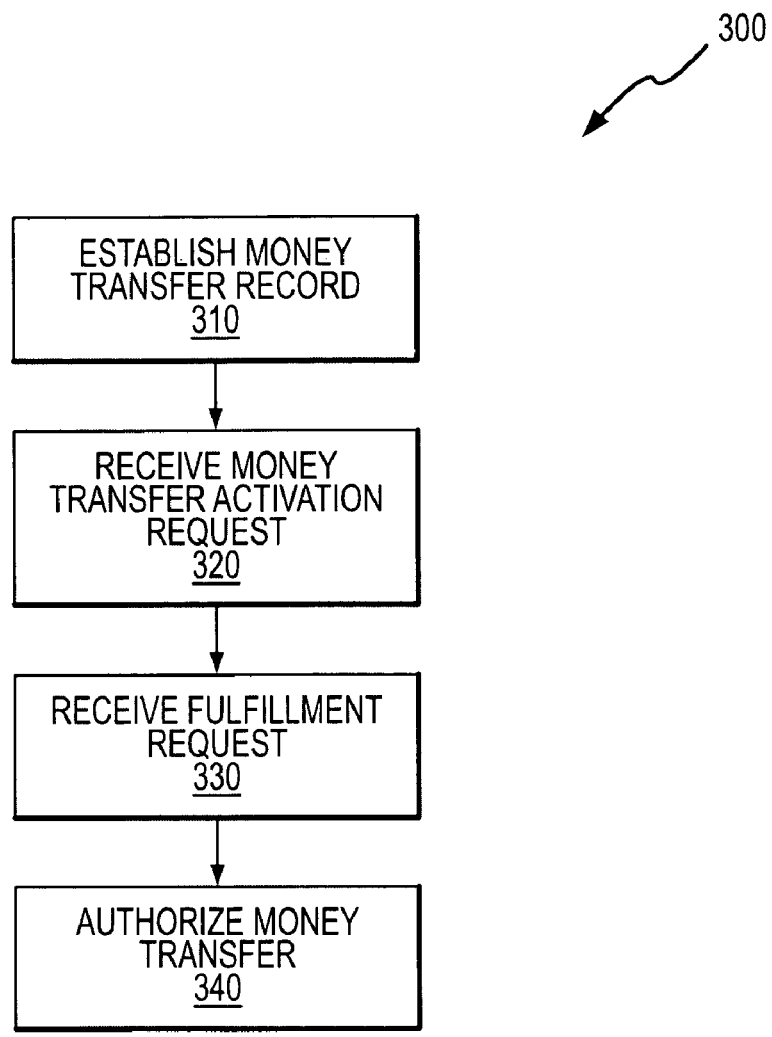
FIG. 3 is a simplified flow diagram of a method according to an embodiment of the present invention.

Turning now to FIG. 3, a method 300 of the present invention will be described. As shown in FIG. 3, method 300 includes establishing a money transfer record (Block 310). This may involve, for example, card processing host system 240 creating a money transfer record and associating the record with a money transfer card 110 for sale at various vendor locations. Method 300 includes receiving a money transfer activation request (Block 320). The receipt of the money transfer activation request may occur according to any of the above described methods. For example, the activation request may be embodied in a UPC or in a magnetic stripe on money transfer card 110 or card assembly 100 that is received by point-of-sale device 210 or a clerk operating point-of-sale device 210. The activation request is sent to host system 240 in one embodiment.

Method 300 optionally includes receiving a payment record. Receipt of the payment record may include point-of-sale device 210 and/or vendor system 220 sending host system 240 and/or system 260 a record that payment has been received from customer 130 for a money transfer associated with money transfer card 110 purchased by customer 130. The payment record may reflect collection of the amount to be transferred and the money transfer fee, if any. In other embodiments, the activation request operates to inform the money transfer organization that the money transfer amount and fees have been collected. In some embodiments, payment is made by first customer 130 during a subsequent fulfillment request.

Method 300 includes receiving a fulfillment request (Block 330). As noted above, the fulfillment request typically will be initiated by customer 130 after purchase of the money transfer card 110. If host systems 240 and/or 260 confirm that all appears in order regarding transfer card 110 and customers 130 and/or 140, method 300 includes authorizing the money transfer (Block 340). The money transfer recipient, customer 140 in this example, then may receive the transferred funds from remote system 250. In some embodiments, system 260 makes the money available to second customer 140 only after a period of time has passed since first customer 130 paid. In this manner, non-cash payments (e.g., checks, credit cards, and other payment methods requiring authorization) made by first customer 130 at the vendor location for the money transfer can be approved or confirmed before dispensing the cash to second customer 140. Further, customer 140 may be required to provide system 250 with the money transfer control number, code 116, account identifier 112, 118, and/or proof of identity. In this manner, desired security controls may be implemented.

Receipt of payment may further include receiving payment of a money transfer fee. In some embodiments, the money transfer fee is deducted from the money transfer amount requested. In other embodiments, customer 130 initiating the transfer pays the amount they desire to transfer to the recipient, and also pays a money transfer fee. Thus, receiving payment may have multiple components. Payment may also include a payment portion for the customer's purchase of various consumer items or services at a retail location operating POS device 210. Database 222 may store a record of the money transfer request being processed. Receipt of the payment record may include receipt of the collected funds, or the receipt of payment records through an ACH or other system.

The fund flow process and interaction between various components of system 200 may occur a number of ways within the scope of the present invention. For example, in one embodiment, customer 130 uses a CSR, IVR, or a website interface 270 to fulfill the transaction. Money transfer host 260 initiates a cash-out on card processing host 240, and then host 260 authorizes payment to customer 140. As previously noted, payment to customer 140 may require that customer 140 provide a money transfer control identifier, personal identification, code 116, or the like.

The advantages of the present invention, including the examples described in conjunction with FIGS. 1-3, are numerous. For the consumer, the consumer now has multiple locations at which they can initiate a money transfer. The consumer may multi-task by sending money from a location at which they had already planned to purchase groceries or the like. Further, the customer need not provide all of the information typically needed for a money transfer to the store clerk, but can interact with experienced money transfer CSRs or systems. As a result, the customer can overcome any language barrier, and receives greater comfort that the money transfer will be effective.

Benefits to the money transfer organization are numerous as well. For example, point-of-sale device 210 can facilitate payment authorization through the credit card authorization and check authentication processes. The money transfer host system will receive payments quickly from the vendor through the ACH or other money transfer processing system. In some embodiments, however, money transfer payments are made in cash, by cashiers check, or other certified funds. The host system operator further benefits by having customers who are satisfied at having additional locations at which a money transfer may be initiated and paid for, but have the information safely and skillfully collected by the host system operator.

Benefits to the vendor operating point-of-sale device 210 also exist. First, the vendor, by participating in this process, is providing an additional service to customers which their competitors may not. This could increase consumer traffic to their store locations. For example, while the above examples describe the user proceeding to a grocery store to purchase items and at the same time initiating a money transfer, the reverse may happen. For example, the customer may proceed to the grocery store to initiate a money transfer, and while they are there purchase a few items. In addition to the possibility of additional purchases, increased revenue may be received by the merchant through commissions paid by the customer and/or the money transfer host. In one embodiment, the vendor receives a small fee from the money transfer organization for each money transfer initiated from the vendor location. Still another advantage to the vendor would be the float available to the vendor. The vendor may have in their account the money associated with the money transfers paid by their customers for a period of time before transmission of the money to host system 240, 260. It will be appreciated by those skilled in the art that additional benefits to each of the parties of the methods of the present invention, arising from one or more components of the systems of the present invention may be realized within the scope of the present invention.

The invention has now been described in detail. However, it will be appreciated that the invention may be carried out in ways other than those illustrated in the aforesaid discussion, and that certain changes and modifications may be practiced within the scope of the appended claims. For example, the money transfer could occur between two regular customers who make use of a transfer pair record as further detailed in U.S. patent application Ser. No. 11/132,725, entitled In-Lane Money Transfer Systems and Methods, filed contemporaneously herewith and assigned to the assignee of the present invention, the complete disclosure of which is incorporated herein by reference. Accordingly, the scope of this invention is not intended to be limited by those specific examples, but rather is to be accorded in the scope represented in the following claims.

What is claimed is:

1. A method of facilitating money transfers, the method comprising:
    establishing a money transfer record associated with a money transfer card;
    making the money transfer card available for sale at a vendor location;
    receiving, from the vendor location, at the request of a sender, a money transfer activation request associated with the money transfer record, wherein the activation request includes an activation amount of money to be associated to the money transfer card;
    receiving, from the sender, the sender's and at least one receiver's personal identification information;
    receiving from the sender a fulfillment request, wherein the fulfillment request comprises a request to transfer a first portion of the activation amount of money to the receiver;
    in response to the fulfillment request, sending a money transfer transaction identifier to the sender;
    authorizing a money transfer associated with the money transfer record to the receiver based on receipt of the money transfer transaction identifier;
    receiving from the sender a second fulfillment request, wherein the second fulfillment request comprises a request to transfer a second portion of the activation amount of money to a second receiver; and
    in response to the second fulfillment request, sending a second money transfer transaction identifier to the sender.

2. The method of facilitating money transfers as in claim 1 wherein receiving the money transfer activation request comprises receiving an account identifier associated with the money transfer record, the account identifier disposed on the money transfer card.

3. The method of facilitating money transfers as in claim 1 wherein the activation request comprises at least one data item selected from a group of data items consisting generally of an account identifier, a customer name, a money transfer amount and a money transfer fee.

4. The method of facilitating money transfers as in claim 1 further comprising establishing a plurality of money transfer records, each of the money transfer records having an associated money transfer card.

5. The method of facilitating money transfers as in claim 1 wherein the money transfer record comprises an account identifier and a code.

6. The method of facilitating money transfers as in claim 5 wherein receiving the fulfillment request comprises receiving the account identifier and the code from the sender.

7. The method of facilitating money transfers as in claim 6 further comprising receiving the fulfillment request with an interactive voice response system.

8. The method of facilitating money transfers as in claim 6 further comprising receiving the fulfillment request with a website.

9. The method of facilitating money transfers as in claim 1 wherein the personal identification information comprises a name of the sender.

10. The method of facilitating money transfers as in claim 1 wherein the personal identification information comprises a name of the receiver.

11. The method as in claim 1 wherein the vendor location comprises a retail outlet.

12. The method of claim 1, wherein the authorizing of the money transfer to the receiver comprises verifying the receiver's personal identification information.

13. The method as in claim 12, wherein the verifying of the receiver's personal identification information comprises verifying using one or more of the money transfer transaction identifier, the receiver's date of birth, a password, and an identification card of the receiver.

14. A method of facilitating money transfers, the method comprising:
    establishing a money transfer record associated with a money transfer card, the money transfer card having an account identifier associated therewith;
    making the money transfer card available for purchase;
    receiving from a sender a money transfer activation request associated with the money transfer record, the activation request including the account identifier and an activation amount;
    receiving, from the sender, the sender's and at least one receiver's personal identification information;
    receiving a first and a second money transfer fulfillment request for the money transfer record, wherein each fulfillment request is for an amount that is less than the activation amount and wherein each fulfillment request comprises the account identifier;

in response to the first fulfillment request, sending a first money transfer transaction identifier to the sender;

in response to the second fulfillment request, sending a second money transfer transaction identifier to the sender, wherein the first and the second money transfer transaction identifiers are different; and authorizing a money transfer to the receiver based on receipt of either the first or the second money transfer transaction identifier.

15. The method as in claim 14, wherein the personal identification information comprises identities for the sender and the receiver.

16. The method as in claim 15 further comprising authorizing a money transfer to the receiver in an amount associated with the money transfer record.

17. A system for facilitating money transfers, comprising:

a host computer system comprising a processor coupled to a database;

wherein the host computer system further comprises:

code for establishing a money transfer record associated with a money transfer card, the money transfer card having an account identifier associated therewith;

code for receiving, from a vendor location, a money transfer activation request associated with a pre-established money transfer record, wherein the activation request includes an activation amount;

code for receiving, from the sender, the sender's and at least one receiver's personal identification information;

code for receiving a fulfillment request for the money transfer record, wherein the fulfillment request is for an amount that is a first portion of the activation amount, thereby retaining a second portion of the activation amount for subsequent money transfers;

in response to the fulfillment request, code for sending a money transfer transaction identifier to the sender;

code for authorizing a money transfer associated with the money transfer record to the receiver based on receipt of the money transfer transaction identifier;

code for receiving a second fulfillment request, wherein the second fulfillment request comprises a request to transfer the second portion of the activation amount of money to a second receiver; and in response to the second fulfillment request, code for sending a second money transfer transaction identifier to the sender.

18. The system as in claim 17 further comprising a point-of-sale device disposed at the vendor location, the point-of-sale device adapted for:

receiving an account identifier from the money transfer card, the account identifier associated with the money transfer record; and providing the money transfer activation request to the host computer system.

19. The system as in claim 17 wherein the host computer system comprises a first host computer having the code for establishing the money transfer record and a second host computer having the code for authorizing the money transfer associated with the money transfer record.

20. The system as in claim 17 wherein the host computer system further comprises code for collecting the personal identification information and associating the personal identification information the money transfer record.

* * * * *